United States Patent [19]

Lees

[11] 4,438,935
[45] Mar. 27, 1984

[54] FLUID SEALS

[75] Inventor: Geoffrey C. Lees, Toongabbie, Australia

[73] Assignee: J. C. Ludowici & Son Ltd., New South Wales, Australia

[21] Appl. No.: 400,112

[22] Filed: Jul. 20, 1982

[30] Foreign Application Priority Data

Jul. 29, 1981 [AU] Australia ............................. PE9968

[51] Int. Cl.³ ............................................. F16J 15/32
[52] U.S. Cl. .................................... 277/205; 277/177; 277/123
[58] Field of Search ................... 277/205, 207 R, 177, 277/123

[56] References Cited

U.S. PATENT DOCUMENTS 4,193,606  3/1980  Iverson ................................ 277/205
4,196,912  4/1980  Quitberg ............................. 277/205
4,304,415 12/1981  Wolf et al. .......................... 277/205

Primary Examiner—Robert I. Smith
Attorney, Agent, or Firm—Dann, Dorfman, Herrell and Skillman

[57] ABSTRACT

A homogeneous self energizing seal comprising an annular member having side walls, a top and a bottom forming the trunk of the seal, the side walls are provided with chamfered upper portions the upper edges of which merges into flat portions on the top of the seal, the bottom edges of the chamfered portions forming the sealing lips of the seal. The flat portions on the top of the seal merge into annular slots or troughs in the top of the seal which has a raised center portion upstanding therefrom.

9 Claims, 5 Drawing Figures

FLUID SEALS

This invention relates to fluid seals. Such seals are used in fluid power systems incorporating cylinders, pumps, valves etc. Over the years working pressures in such systems have steadily increased from working pressures of 2000 lb/sq. inch to 5000 lb/sq. inch. These higher working pressures have been made possible by the availability of more accurate machine tools and surface finishing equipment used in the manufacture of fluid power systems. Additionally, the higher working pressures have been brought about by the requirements of industry generally and it is anticipated that working pressures of the order of 10,000 lb/sq. inch will be used in equipment of this type in the foreseeable future.

These substantial increases in working pressures have necessitated the improvement in performance of fluid sealing elements used in such systems and experience has shown that high pressure seals must fulfil the following requirements:

(a) the seal must have a high modulus of rigidity at elevated working temperatures so that in use the base portion of the seal does not compress, expand sideways and jam hard against the moving member under the action of fluid pressure thereby generating high frictional forces leading to high temperature levels which lead to a breakdown of the seal.

(b) The modulus of rigidity must also be such as to prevent extrusion of the heel of the seal down the clearance gap between the seal recess and the moving member. If extrusion occurs a "nibbling" effect is caused at the heel of the seal which also leads to a breakdown of the seal.

(c) The seal must have high abrasion, cut and tear resistance characteristics.

(d) It must have sufficient resilience to cater for high hydraulic shock loads.

(e) It must have low compression set and stress relaxation characteristics so that under operating conditions a good seal is maintained with the working part to minimise leakage.

(f) The material of the seal must be compatible with the fluid used in the system and with the surrounding environment.

(g) The seal must be sufficiently flexible so as to facilitate fitting.

Hitherto, these requirements have been satisfied to a workable extent by seals of various types.

According to one such type the seals have been produced from various types of elastomers reinforced with textile fibres or bonded to metal or plastic inserts. Seals of this type are expensive to manufacture since they involve a multiplicity of materials and manufacturing operations.

According to another type the seal has been manufactured from two parts namely, an outer case of polyurethane provided with an annular groove or slot in which is inserted an energiser ring of a specially compounded synthetic rubber which enables the sealing lips of the seal to flex during fitting of the seal and which provides the outward sealing force.

While seals of this type are an improvement over the first mentioned type, such seals are still relatively expensive to produce in that they require the use of two sets of moulding tools, two moulding operations and two different types of materials. Additionally, the energiser ring has to be manually inserted in the annular groove or slot and instances have been encountered where in use the energiser ring has become displaced from its groove or slot thereby causing the seal to leak during fitting or while in service.

The present invention provides a homogeneous self energising seal which overcomes the disadvantages associated with seals hitherto and which is cheaper to manufacture than such seals.

The invention in its broadest form resides in a homogeneous self energising seal comprising an annular member having side walls, a top and a bottom forming the trunk of the seal, the side walls having top chamfered portions, the upper edge of which merges into flat portions on the top of the seal, the bottom edges of said chamfered portions forming the sealing lips of the seal, the flat portions merging into annular slots or troughs in the top of the seal and a raised centre portion upstanding from the top of the seal inwardly of said slot or trough.

In one form of the invention the trunk has parallel side walls and in another form of the invention the side walls of the trunk taper slightly towards each other. The bottom of the seal may be flat or have a portion thereof domed upwardly to provide a seat and centring means for another seal in those cases where more than one seal is used in a single application.

The invention will now be described with reference to preferred embodiments thereof in which.

Figure 1:
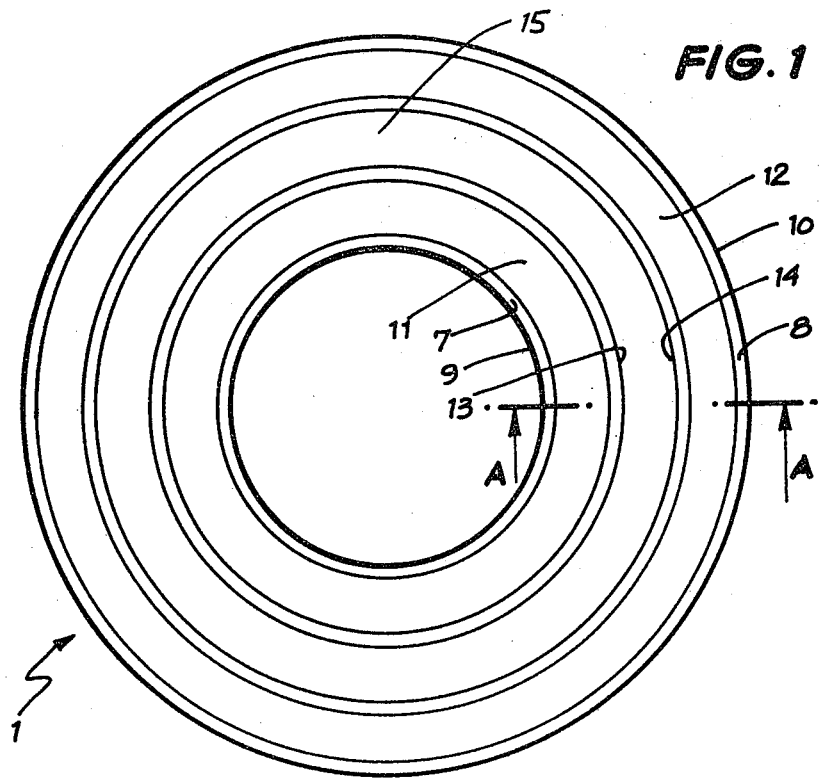
FIG. 1 is a plan view of the seal.

As indicated in FIG. 1, the seal is annular in shape and includes a body formed of homogeneous polyurethane having a trunk portion 1 which includes a base 2, side walls 3 and 4, the upper portions of which are flared outwardly as at 5 and 6 and then chamfered inwardly as at 7 and 8 thereby defining the sealing lips 9 and 10 of the seal. The trunk portion is dimensioned to clear mating machine parts so as to reduce dynamic friction forces when the seal is operating under high pressures.

Figure 2:
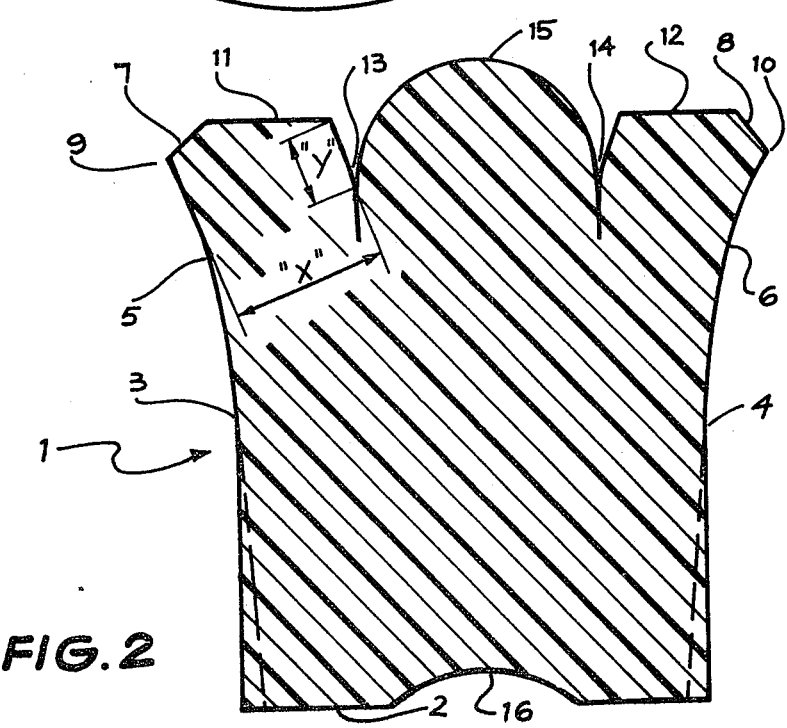
FIG. 2 is a sectional view on line A—A of FIG. 1 and showing in dotted outline a modification.
Figure 3:
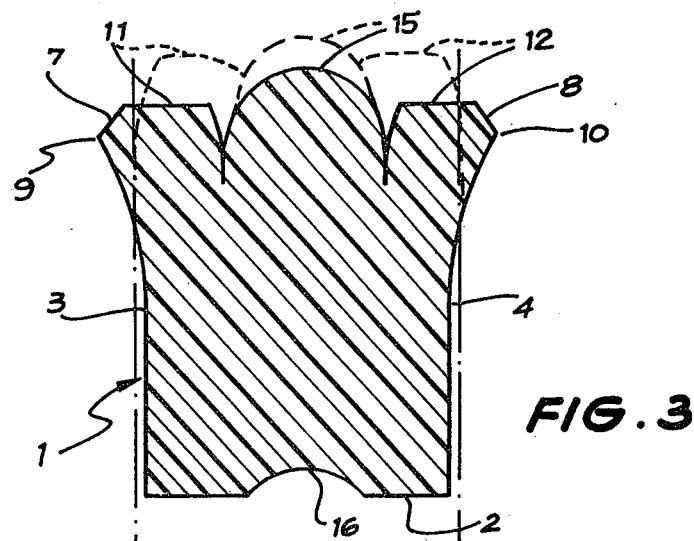
FIG. 3 is a similar view of FIG. 2 showing in dotted outline the approximate shape which the seal assumes when installed.

In FIG. 2 the side walls 3 and 4 are shown in full outline as to be parallel to each other, however, in certain applications the walls may be tapered inwardly as shown in dotted outline in order to minimise such frictional forces. The sealing lips 9 and 10 ensure intimate contact with the mating machine parts throughout the life of the seal.

The chamfered portions merge into flat portions 11 and 12 which terminate in deep "V" shaped troughs 13 and 14 which in turn merge into a protrusion 15 and the bottom of the seal may be curved upwardly as indicated at 16.

Figure 4:
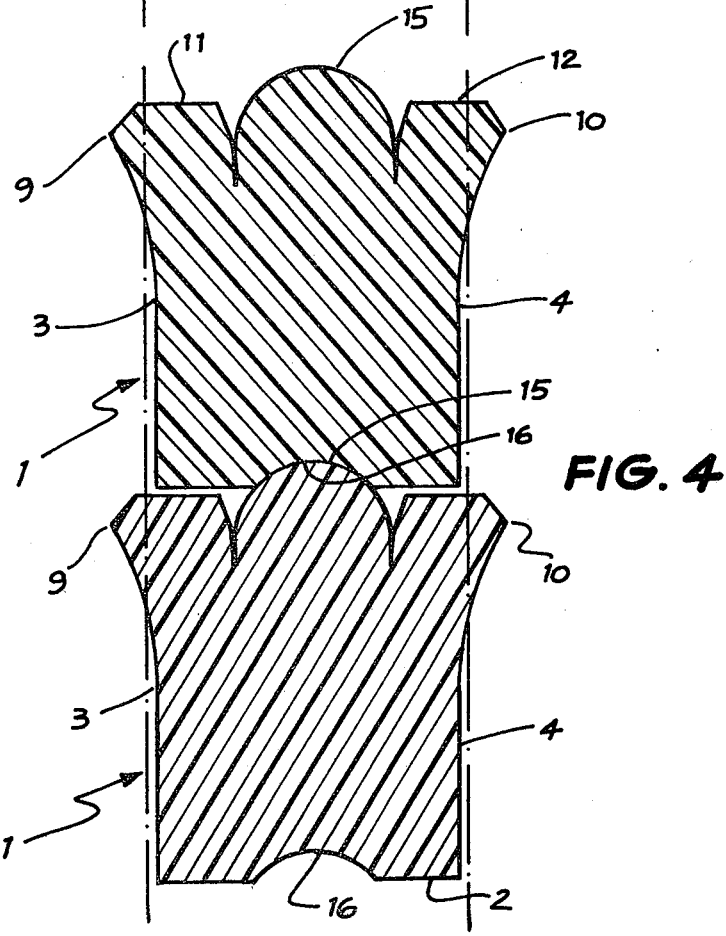
FIG. 4 is also a sectional view on line A—A of FIG. 1, showing the use of two seals in the one application.
Figure 5:
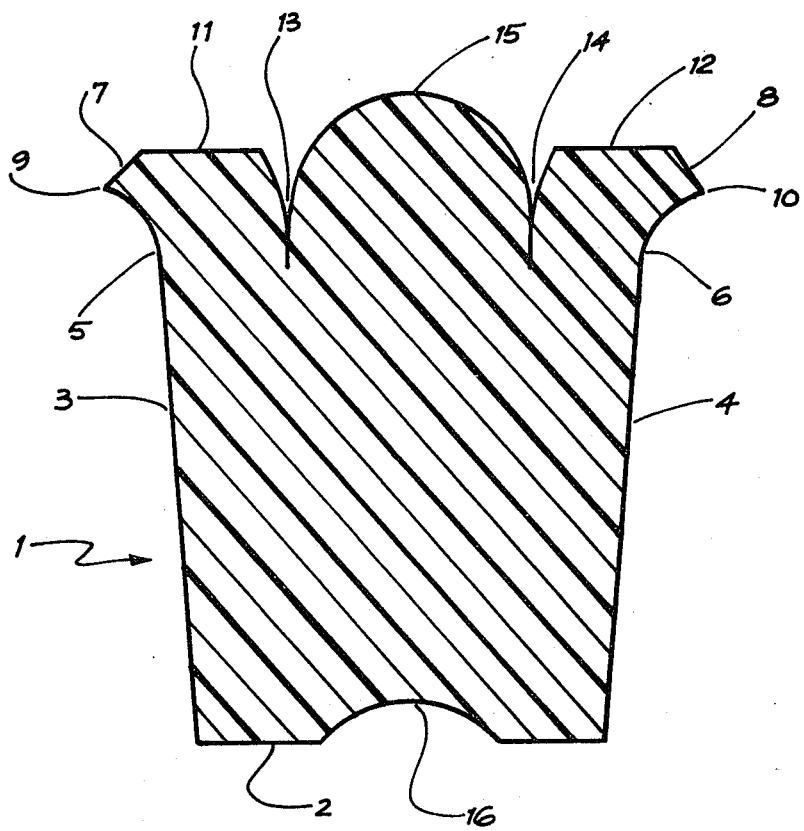
FIG. 5 is a sectional view similar to the FIG. 2 but showing a further shaped modification.

The protrusion 15 functions as a buffer contacting the machine parts thereby protecting the sealing lips during movement of the seal and in those cases where two or more seals are used in a single application as indicated in FIG. 4, the protrusion 15 co-operates with the dome bottom portion 16 in the base of the seal to centralise and space the seal assembly. It will be appreciated however, that where only one seal is used the dome shaped bottom 16 is not required, however, for the purpose of utility it is preferred to manufacture the seal with the mentioned dome shaped portion.

The "V" shaped troughs 13 and 14 are essential to the performance and installation of the seal. These troughs allow the sealing lips 9 and 10 to behave in a manner analogous to a cantilevered beam and to bend inwards with comparative ease when being fitted into the seal recess. These deep troughs also allow the seal to be twisted relatively easy despite the high modulus of the material when the seal is being fitted into a blind recess.

Clearly the force required to move the lips 9 and 10 inwards (which of course is equal to the outward sealing force) can, for a particular modulus of material, be controlled by varying the thickness "X" of the lips and the depth "Y" of the troughs 13 and 14.

In practice, the top shape of the protrusion 15 is designed such that when the seal is installed in the seal recess, the troughs 13 and 14 are completely closed and the protrusion 15 is subject to a degree of transverse compression thereby ensuring that the outward sealing force is maintained as the sealing lips abrade away under normal usage.

This compression of the protrusion 15 also eliminates any possibility of the sealing lips 9 and 10 collapsing inwards due to pressure or hydraulic impact effects which can cause high pressure fluid to escape or leak down the sides of the seal.

It has been found that seals manufactured from a polyurethane compound formed by the reaction of a polyhydroxyl compound and a diisocyanate with chemical additions to reduce the compression set and stress relaxation at elevated temperatures perform satisfactorily. The polyurethane may or may not be cross linked with hydroxyl or amine compounds.

I claim:

1. A homogeneous self-energising seal comprising an annular member having side walls, a top and a bottom forming the trunk of the seal, the side walls having top chamfered portions, the upper edges of which merge into flat portions on the top of the seal, the bottom edges of said chamfered portions forming the sealing lips of the seal, the flat portions merging into spaced annular slots or troughs in the top of the seal which are separated by a raised centre portion upstanding from the top of the seal.

2. A homogeneous self energising seal as claimed in claim 1 wherein said slots or troughs are "V" shaped in cross section.

3. A homogeneous self energising seal as claimed in claims 1 or 2 wherein said raised centre portion is semi-circular in cross-section.

4. A homogeneous self energising seal as claimed in claim 1 wherein the trunk of the seal has parallel side walls.

5. A homogeneous self energising seal as claimed in claim 1 wherein the trunk of the seal has outwardly curved upper portions merging into said sealing lip.

6. A homogeneous self energising seal as claimed in claim 1 wherein the side walls of said trunk tapers inwardly towards the bottom of the seal.

7. A homogeneous self energising seal as claimed in any one of claims 1–6 wherein the bottom of the seal is flat.

8. A homogeneous self energising seal as claimed in any one of claims 1–6 wherein the bottom of the seal is provided with a centrally disposed concave seat.

9. A homogeneous self energising seal as claimed in any one of claims 1 to 8 wherein the depth of the slots or troughs is such as to allow the seal to be twisted relatively easy so as to facilitate the fitting of the seal into a blind recess.

* * * * *

UNITED STATES PATENT AND TRADEMARK OFFICE
CERTIFICATE OF CORRECTION

PATENT NO. : 4,438,935

DATED : March 27, 1984

INVENTOR(S) : Geoffrey C. Lees

It is certified that error appears in the above-identified patent and that said Letters Patent is hereby corrected as shown below:

Claim 7, line 2, delete "any one of claims 1-6" and insert --claim 1--.
Claim 8, line 2, delete "any one of claims 1-6" and insert --claim 1--.
Claim 9, line 2, delete "any one of claims 1 to 8" and insert --claim 1--.

Signed and Sealed this

Eighteenth Day of September 1984

[SEAL]

Attest:

GERALD J. MOSSINGHOFF

Attesting Officer

Commissioner of Patents and Trademarks